(12) United States Patent
Nagasue et al.

(10) Patent No.: US 11,745,812 B2
(45) Date of Patent: Sep. 5, 2023

(54) RUNNING DEVICE

(71) Applicant: DMG MORI CO., LTD., Nara (JP)

(72) Inventors: Hideki Nagasue, Nara (JP); Ryota Maeda, Nara (JP); Masaaki Nakagawa, Nara (JP); Hideaki Tanaka, Nara (JP)

(73) Assignee: DMG MORI CO., LTD., Nara (JP)

( * ) Notice: Subject to any disclaimer, the term of this patent is extended or adjusted under 35 U.S.C. 154(b) by 0 days.

(21) Appl. No.: 17/797,903

(22) PCT Filed: Oct. 29, 2020

(86) PCT No.: PCT/JP2020/040584
§ 371 (c)(1),
(2) Date: Aug. 5, 2022

(87) PCT Pub. No.: WO2021/157144
PCT Pub. Date: Aug. 12, 2021

(65) Prior Publication Data
US 2023/0039873 A1 Feb. 9, 2023

(30) Foreign Application Priority Data

Feb. 6, 2020 (JP) .................................. 2020-018647

(51) Int. Cl.
*B62D 61/10* (2006.01)
*B62D 65/18* (2006.01)
(Continued)

(52) U.S. Cl.
CPC ............... *B62D 61/10* (2013.01); *B60G 5/02* (2013.01); *B60G 5/025* (2013.01); *B60G 5/043* (2013.01);
(Continued)

(58) Field of Classification Search
CPC .......... B62D 61/10; B62D 65/18; B60G 5/02; B60G 5/025; B60G 2200/32;
(Continued)

(56) References Cited

U.S. PATENT DOCUMENTS 2,051,864 A * 8/1936 Knox .................... B60G 11/23
280/681
2,121,862 A * 6/1938 Dodge .................... B60G 5/02
280/81.1
(Continued)

FOREIGN PATENT DOCUMENTS

CN 108100076 A * 6/2018 ............... B60K 1/00
CN 112158275 A * 1/2021 ........... B60K 7/0007
(Continued)

OTHER PUBLICATIONS

International Search Report for related Application No. PCT/JP2020/040584; report dated Nov. 24, 2020.

*Primary Examiner* — Drew J Brown
*Assistant Examiner* — Matthew D Lee
(74) *Attorney, Agent, or Firm* — von Briesen & Roper, s.c.

(57) ABSTRACT

Provided is a running device including a frame (11) and a first wheel part (15) and a second wheel part (35) arranged with an appropriate distance therebetween along a running direction (R). The first wheel part (15) includes a first left support arm (17) and a first right support arm (26) arranged on the frame (11) in a manner to be swingable within a plane extending along the running direction (R). The second wheel part (35) includes a second support arm (36) arranged on the frame (11) in a manner to be swingable within a plane perpendicular to the running direction (R). The first left support arm (17) has first left wheels (19, 21) respectively on both sides thereof, and the first right support arm (26) has first right wheels (28, 30) respectively on both sides thereof.

(Continued)

The second support arm (36) has a second left wheel (38) and a second right wheel (40) respectively on both sides thereof.

8 Claims, 7 Drawing Sheets

(51) Int. Cl.
  *B60G 5/02* (2006.01)
  *B60G 5/04* (2006.01)
(52) U.S. Cl.
  CPC ........ *B62D 65/18* (2013.01); *B60G 2200/318* (2013.01); *B60G 2200/32* (2013.01)
(58) Field of Classification Search
  CPC ...... B60G 2206/0112; B60G 2200/318; B60G 5/04; B60G 5/043
  See application file for complete search history.

(56) References Cited

U.S. PATENT DOCUMENTS

| | | | | |
|---|---|---|---|---|
| 2,226,100 | A * | 12/1940 | Larison | B60G 5/02 280/81.1 |
| 3,716,250 | A * | 2/1973 | Gorres | B60G 5/02 280/80.1 |
| 5,339,611 | A * | 8/1994 | Roderfeld | B60G 5/00 180/209 |
| 11,124,233 | B1 * | 9/2021 | Kurczewski | B60G 9/02 |
| 2012/0256392 | A1 * | 10/2012 | Oriet | B62D 21/04 280/425.1 |
| 2015/0084301 | A1 * | 3/2015 | Johnson | B60G 5/025 280/124.112 |
| 2021/0309060 | A1 * | 10/2021 | Stelman | B62D 63/04 |
| 2022/0153365 | A1 * | 5/2022 | Izuo | B60K 17/02 |

FOREIGN PATENT DOCUMENTS

| | | | | |
|---|---|---|---|---|
| CN | 112440647 | A * | 3/2021 | |
| CN | 113147953 | A * | 7/2021 | |
| CN | 114454961 | A * | 5/2022 | |
| DE | 102017123091 | A1 * | 7/2018 | ........... B60G 17/005 |
| JP | H07187029 | A | 7/1995 | |
| JP | 2002037147 | A | 2/2002 | |
| JP | 2005144631 | A | 6/2005 | |
| JP | 2006335240 | A | 12/2006 | |
| JP | 2008213732 | A | 9/2008 | |
| JP | 2011251632 | A | 12/2011 | |
| JP | 2017222297 | A | 12/2017 | |
| JP | 2019008359 | A | 1/2019 | |
| JP | 6935032 | B1 * | 9/2021 | |
| WO | WO-2013178882 | A1 * | 12/2013 | ............. A01G 23/00 |
| WO | WO-2017076813 | A1 * | 5/2017 | ............. B25J 19/02 |
| WO | WO-2022185106 | A1 * | 9/2022 | ............. A01G 23/00 |

* cited by examiner

RUNNING DEVICE

TECHNICAL FIELD

The present invention relates to a running device arranged on a running vehicle such as an automatic guided vehicle.

BACKGROUND ART

For example, in a manufacturing system called FMS (Flexible Manufacturing System), machine tools are arranged appropriately in a plant and an automatic guided vehicle (running vehicle) is used to deliver a workpiece to be machined, a tool, etc. to each machine tool and also used to collect a machined workpiece, a used tool, etc. from each machine tool. This manufacturing system realizes an unmanned and automated production.

A known example of the automatic guided vehicle is disclosed in Patent Literature 1 listed below. This automatic guided vehicle has a distance measurement device that rotationally drives a light projector projecting a light and outputs distance measurement data based on receipt of a reflected light from an object to be measured, a map generator that generates map information based on the distance measurement data, and an obstacle sensor that senses an obstacle.

A typical running device of an automatic guided vehicle has a frame, a first driven wheel part, a drive wheel part, and a second driven wheel part. The first driven wheel part, the drive wheel part, and the second driven wheel part are arranged at appropriate intervals along the running direction and connected to the frame. The first driven wheel part and the second driven wheel part each include left and right driven wheels, and the drive wheel part includes left and right drive wheels. The automatic guided vehicle runs by rotation of the left and right drive wheels, and the running direction of the automatic guided vehicle is controlled by controlling the numbers of rotations of the left and right drive wheels.

In using this automatic guided vehicle, the automatic guided vehicle is first operated, for example, by manual operation, to cause the automatic guided vehicle to run in a plant building, during which planar map information that defines an inner profile of the plant building and outer profiles of machine tools and other devices arranged in the plant building is generated by the map generator based on the distance measurement data measured by the distance measurement device.

Further, the automatic guided vehicle identifies the current position of itself (self position) in the plant building based on the distance measurement data measured by the distance measurement device and the map information previously generated by the map generator. Thus, the automatic guided vehicle autonomously runs tracklessly along a predetermined path based on the plant-building map information and the self position information to perform the delivery of workpieces and tools.

An automatic guided vehicle does not always run in a plant building having only a flat area, but in some cases, runs in a plant building having not only a flat area but also an area with some bumps and dips. Further, in the case of using an autonomously running automatic guided vehicle, the running path for the automatic guided vehicle is sometimes set in an intentionally formed stepped area.

In the case where the above-described automatic guided vehicle runs in an area with bumps and dips or in an intentionally formed stepped area, it is possible that the drive wheels leave the ground and cannot come into contact with the ground surface when the first driven wheel part or the second driven wheel part runs onto a bump or a step. In such a case, the automatic guided vehicle loses its thrust force and goes out of control, so that the automatic guided vehicle cannot continue running.

In view of these circumstances, a running device as disclosed in Patent Literature 2 listed below has been proposed. This running device has a center frame and a pair of running parts (rocker-bogie mechanisms) symmetrically mounted to the center frame. Each running part includes a rocker frame pivotably supported by the center frame, a bogie frame pivotably supported on a first end of the rocker frame, and first, second, and third wheels respectively rotationally supported on a second end of the rocker frame and both ends of the bogie frame. The second wheels are drive wheels that are independent from each other, and the second wheels are each positioned between the associated first and third wheels that are driven wheels.

Between the rocker frames, two stabilizers, which are each constituted by a bar member, are respectively provided between the first ends and between the second ends. The center frame has two pivot support members provided thereon that respectively support the bar members constituting the stabilizers such that the bar members are pivotable. The rocker frames each have support members respectively provided on the first and second ends thereof that each support the corresponding bar member such that the bar member is slidable.

The configuration in which the pair of rocker-bogie mechanisms are respectively pivotably supported on both sides of the center frame enables the running device to run while maintaining a stable posture even when one of the rocker-bogie mechanisms climbs over a step or climbs on or down a step, and also enables the center frame to maintain its own horizontality even when the rocker-bogie mechanisms climb over a step or climb on or down a step. Further, increase of the overall height of this running device is suppressed because the rocker frames constituting the rocker-bogie mechanisms extend horizontally, so that stable running of the running device is ensured.

CITATION LIST

Patent Literature

Patent Literature 1: Japanese Unexamined Patent Application Publication No. 2019-8359
Patent Literature 2: Japanese Unexamined Patent Application Publication No. 2017-222297

SUMMARY OF INVENTION

Technical Problem

Although the above-described running device disclosed in Patent Literature 2 provides the above-described advantages, it has a complicated structure since the bogie frames are pivotably supported on the first ends of the rocker frames that are also pivotably supported by the center frame, and besides, between the rocker frames, the two stabilizers each constituted by a bar member are respectively provided between the first ends and between the second ends, which causes an increase in equipment cost.

In the field of equipment such as plant equipment, cost reduction is always desired. The above-described running device is no exception, that is to say, cost reduction is desired for the above-described running device.

The present invention has been achieved in view of the above-described circumstances, and an object of the invention is to provide a running device which has a simple structure and therefore can be manufactured at a low cost.

Solution to Problem

To solve the above-described problem, the present invention provides a running device arranged on a running vehicle, including:

a frame; and a first wheel part and a second wheel part arranged with an appropriate distance therebetween along a running direction and connected to the frame, the first wheel part including a first left support arm and a first right support arm respectively disposed on a left side and a right side with respect to the running direction and each connected to the frame in a manner to be swingable within a vertical plane extending along the running direction, the second wheel part including a second support arm connected to the frame in a manner to be swingable within a vertical plane perpendicular to the running direction, the first left support arm having a first left wheel on each of both sides of a center of swinging thereof, the first left wheels being each supported in a manner to be rotatable about a horizontal axle perpendicular to the running direction, the first right support arm having a first right wheel on each of both sides of a center of swinging thereof, the first right wheels being each supported in a manner to be rotatable about a horizontal axle perpendicular to the running direction, the second support arm having a second left wheel and a second right wheel respectively on both sides of a center of swinging thereof, the second left wheel and the second right wheel being each supported in a manner to be rotatable about an axle perpendicular to the running direction, the center of swinging of the first left support arm being positioned on a line connecting centers of the two first left wheels, the center of swinging of the first right support arm being positioned on a line connecting centers of the two first right wheels.

In the thus-configured running device, the first left support arm and first right support arm constituting the first wheel part are each swingable within a vertical plane extending along the running direction, and the second support arm constituting the second wheel part is swingable within a vertical plane perpendicular to the running direction. Further, the frame is supported by six wheels, namely, the two first left wheels arranged on both sides of the first left support arm, the two first right wheels arranged on both sides of the first right support arm, and the second left wheel and second right wheel arranged on both sides of the second support arm.

Therefore, when one of the first left wheels arranged on both sides of the first left support arm runs onto a step on the ground, the first left support arm swings so that the difference in level of the step is absorbed and all the wheels of the running device are thereby kept in contact with the floor surface. Further, also when one of the first right wheels arranged on both sides of the first right support arm runs onto a step on the ground, the first right support arm swings so that the difference in level of the step is absorbed and all the wheels of the running device are thereby kept in contact with the ground surface. Furthermore, also when one of the second left wheel and second right wheel arranged on both sides of the second support arm runs onto a step on the ground, the second support arm swings so that the difference in level of the step is absorbed and all the wheels of the running device are thereby kept in contact with the ground surface.

Thus, with the running device according to the present invention, when a wheel of the running device runs onto a step on the ground, the corresponding one of the first left support arm, first right support arm, and second support arm swings so that the difference in level of the step is absorbed and all the wheels of the running device are thereby kept in contact with the ground surface, which enables the running device to run stably.

Further, this running device is configured such that the wheels are supported by three swingably-supported support arms, namely, the first left support arm, the first right support arm, and the second support arm. Therefore, this running device has a simple structure as compared with the conventional running device and therefore can be manufactured at a low cost.

The running device according to the present invention may have a configuration in which:

the second support arm of the second wheel part has a third left support arm and a third right support arm respectively on both sides of the center of swinging thereof, the third left support arm and the third right support arm being each swingable within a plane extending along the running direction;

the third left support arm has the second left wheel on each of both sides of a center of swinging thereof, the second left wheels being each supported in a manner to be rotatable about an axle perpendicular to the running direction; and the third right support arm has the second right wheel on each of both sides of a center of swinging thereof, the second right wheels being each supported in a manner to be rotatable about an axle perpendicular to the running direction.

In the thus-configured running device, the frame is supported by eight wheels in total, namely, the two first left wheels arranged on the first left support arm, the two first right wheels arranged on the first right support arm, the two second left wheels arranged on the third left support arm, and the two second right wheels arranged on the third right support arm. Further, besides the swinging motions of the first left support arm, first right support arm, and second support arm, the swinging motions of the third left support arm and third right support arm are also capable of absorbing a difference in level on the ground. Therefore, the running device is capable of absorbing more various types of unevenness formed on the ground.

Further, the running device according to the present invention may have a configuration in which at least one of the first left wheels and second left wheel or wheels and at least one of the first right wheels and second right wheel or wheels are drive wheels.

Furthermore, each of the wheels other than the drive wheels may be composed of a universal wheel. Alternatively, each of the wheels other than the drive wheels may be composed of an omni wheel.

Advantageous Effects of Invention

As described above, with the running device according to the present invention, when a wheel of the running device runs onto a step on the ground, the corresponding one of the first left support arm, first right support arm, and second support arm swings so that the difference in level of the step is absorbed and all the wheels of the running device are thereby kept in contact with the ground surface, which enables the running device to run stably.

Further, the running device according to the present invention is configured such that the wheels are supported by three swingably-supported support arms, namely, the first left support arm, the first right support arm, and the second support arm. Therefore, the running device has a simple structure as compared with the conventional running device and therefore can be manufactured at a low cost.

BRIEF DESCRIPTION OF DRAWINGS

FIG. 6 is a side view of the omni wheel as viewed in the direction of arrow C in

FIG. 5;

DESCRIPTION OF EMBODIMENTS

Hereinafter, a specific embodiment of the present invention will be described with reference to the drawings.

Figure 1:
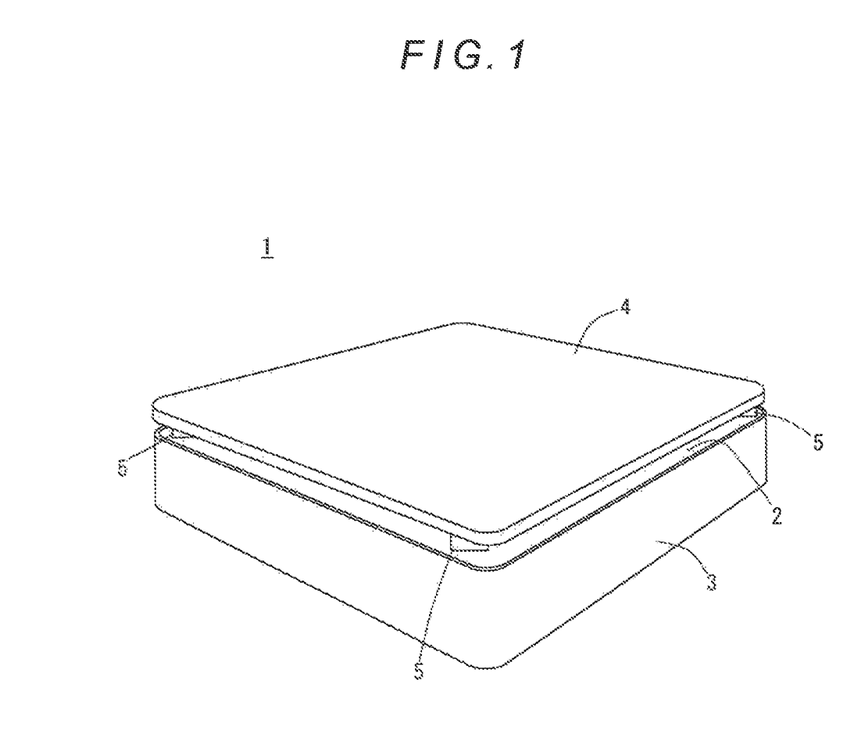
FIG. 1 is a perspective view illustrating an automatic guided vehicle according to a specific embodiment of the present invention.
Figure 2:
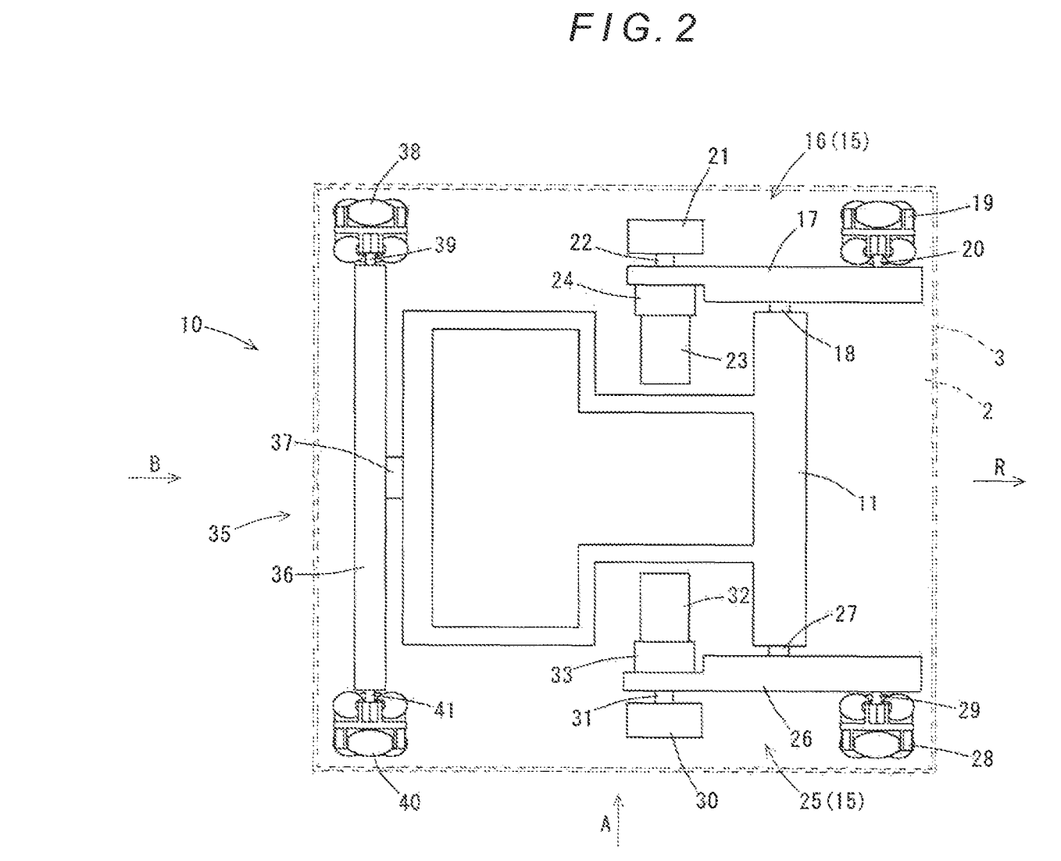
FIG. 2 is a plan view illustrating a running device according to the embodiment.

As illustrated in FIGS. 1 and 2, an automatic guided vehicle 1 according to this embodiment has a running device 10, a support base 2 having a rectangular shape in plan view and arranged on the running device 10, sensors 5 respectively arranged on three corners of an upper surface of the support base 2, a cover 3 surrounding the support base 2, and a liftable table 4 having a rectangular shape in plan view and arranged on the support base 2 in a manner to be liftable up/down. Note that the liftable table 4 lifts up/down by being driven by a lifting mechanism that is not illustrated in the drawings. The running device 10 and the lifting mechanism (not illustrated) are controlled by a controller that is not illustrated in the drawings.

Figure 3:
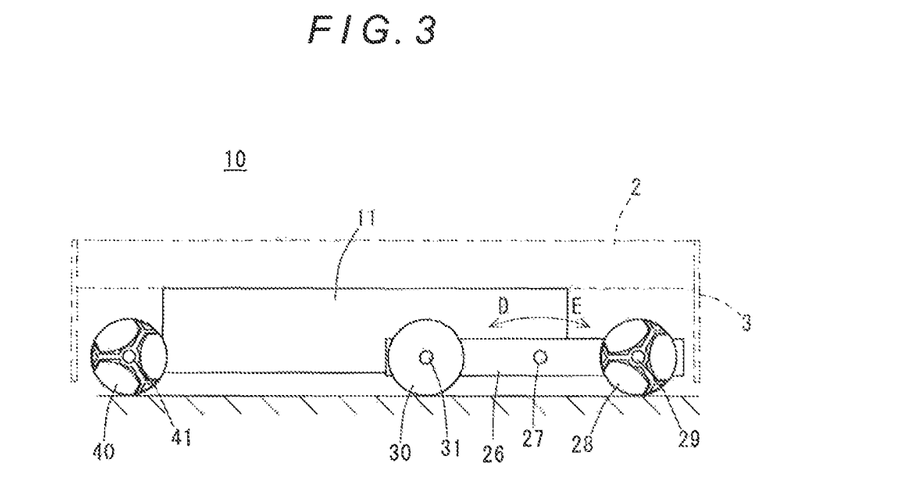
FIG. 3 is a front view of the running device as viewed in the direction of arrow A in FIG. 2.
Figure 4:
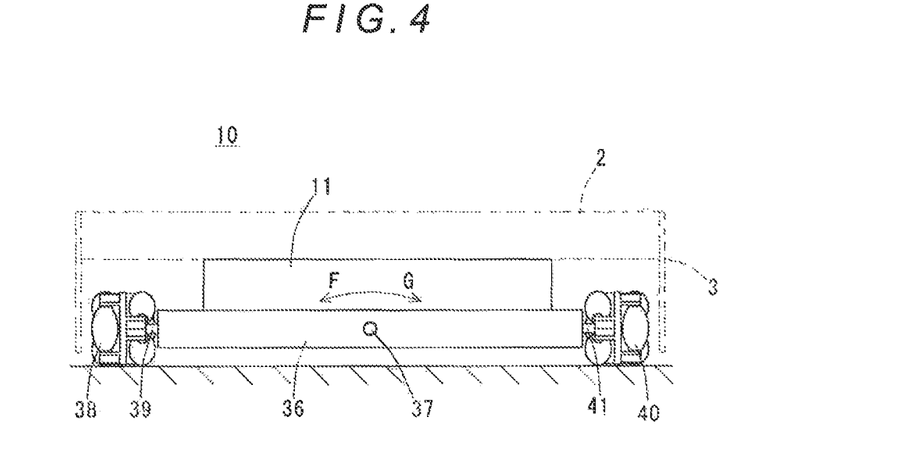
FIG. 4 is a side view of the running device as viewed in the direction of arrow B in FIG. 2.

As illustrated in FIGS. 2 to 4, the running device 10 has a frame 11 and a first wheel part 15 and a second wheel part 35 respectively arranged on the front side and the rear side with an appropriate distance therebetween along the running direction (the direction indicated by arrow R) and connected to the frame 11. Note that the frame 11 is formed to have, in plan view, spaces cut out appropriately for arranging necessary structural objects therein and have a hollow interior for the sake of weight reduction.

The first wheel part 15 consists of a first left wheel unit 16 and a first right wheel unit 25 respectively disposed on the left side and the right side with respect to the running direction. The first left wheel unit 16 includes a first left support arm 17 arranged on a left side surface of the frame 11 and first left wheels 19, 21 respectively supported on both ends of the first left support arm 17 in a manner to be rotatable about horizontal axles 20, 22 perpendicular to the running direction.

The first right wheel unit 25 includes a first right support arm 26 arranged on a right side surface of the frame 11 and first right wheels 28, 30 respectively supported on both ends of the first right support arm 26 in a manner to be rotatable about horizontal axles 29, 31 perpendicular to the running direction.

The first right support arm 26 is supported by a support shaft 27 arranged on the right side surface of the frame 11 so as to be swingable in the directions indicated by arrow D-E in FIG. 3 within a vertical plane extending along the running direction. Similarly, the first left support arm 17 is supported by a support shaft 18 arranged on the left side surface of the frame 11 so as to be swingable in directions identical to the arrow D-E directions within a vertical plane extending along the running direction.

Note that, in this embodiment, the first left wheel 19 and the first right wheel 28, which are disposed on the front side in the running direction, are driven wheels and the first left wheel 21 and the first right wheel 30, which are disposed on the rear side in the running direction, are drive wheels. The first left wheel 21 is connected to a motor 23 via a decelerator 24 arranged on the first left support arm 17 so that the first left wheel 21 rotates by being driven by the motor 23. Similarly, the first right wheel 30 is connected to a motor 32 via a decelerator 33 arranged on the first right support arm 26 so that the first right wheel 30 rotates by being driven by the motor 32.

The second wheel part 35 includes a second support arm 36 arranged on the rear side of the frame 11 in the running direction. The second support arm 36 is supported by a support shaft 37 arranged on a rear side surface of the frame 11 so as to be swingable in the directions indicated by arrow F-G in FIG. 4 within a vertical plane perpendicular to the running direction. Further, the second support arm 36 has a second left wheel 38 and a second right wheel 40 respectively on both ends thereof that are respectively supported in a manner to be rotatable about horizontal axles 39, 41 perpendicular to the running direction. Note that the second left wheel 38 and the second right wheel 40 are driven wheels.

Figure 5:
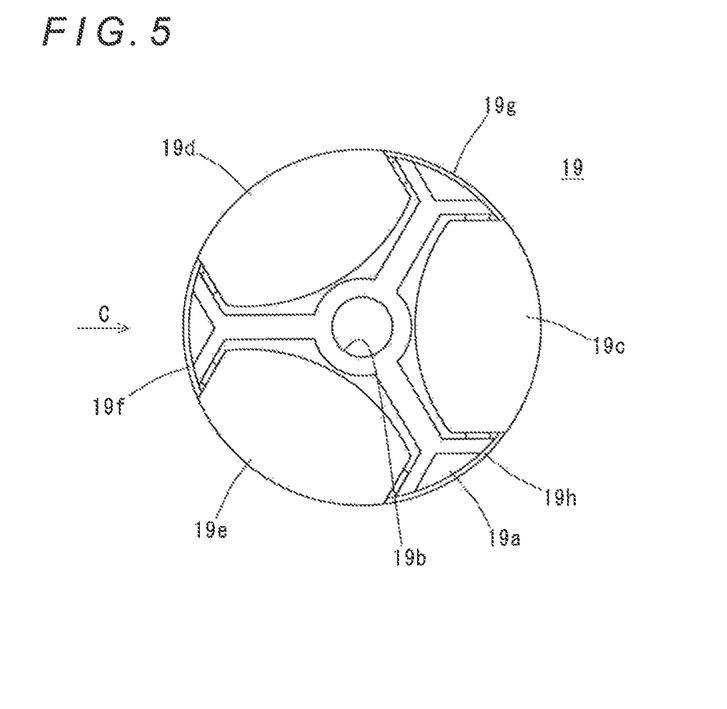
FIG. 5 is a front view illustrating an omni wheel in the embodiment.
Figure 6:
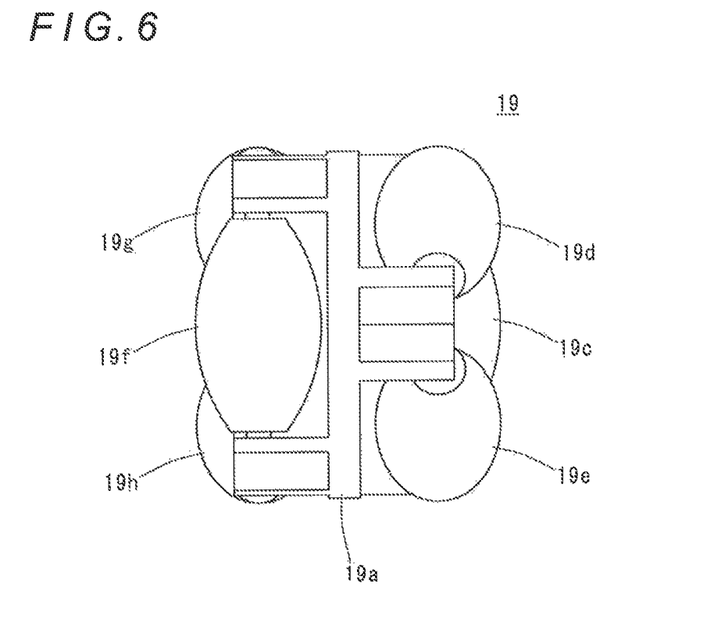

The first left wheel 19, the first right wheel 28, the second left wheel, 38, and the second right wheel 40 have the same configuration and they are each composed of an omni wheel. Although the following description is directed to the first left wheel 19 as a representative one that is illustrated in FIGS. 5 and 6, the first right wheel 28, the second left wheel 38, and the second right wheel 40 are also configured in the same manner. Note that the first left wheel 21 and the first right wheel 30 are each composed of an ordinary wheel; therefore, detailed description of them is omitted.

As illustrated in FIGS. 5 and 6, the first left wheel 19 consists of a body 19a having a center hole 19b formed in the center thereof for inserting the axle 20 therein, rollers 19c, 19d, 19e arranged on the right side of the body 19a in FIG. 6, and rollers 19f, 19g, 19h arranged on the left side of the body 19a in FIG. 6. The body 19a has a disk-shaped base, and the base has ribs formed on the left and right sides thereof for supporting the rollers 19c, 19d, 19e, 19f, 19g, 19h in vertical planes such that the rollers 19c, 19d, 19e, 19f, 19g, 19h are each rotatable.

The rollers 19c, 19d, 19e, 19f, 19g, 19h have a drum-like shape with the same curvature and are respectively rotatably supported by support shafts that are supported by the ribs so as to be positioned in vertical planes. The rollers 19c, 19d, 19e are arranged at equal intervals in the circumferential direction of the body 19a, and the rollers 19f, 19g, 19h are also arranged at equal intervals in the circumferential direction of the body 19a. The rollers 19c, 19d, 19e and the rollers 19f, 19g, 19h are arranged such that they are phase-shifted 60° relative to each other in the circumferential direction.

Further, the rollers 19c, 19d, 19e are arranged such that outer surfaces thereof are located on the same arc in a vertical plane including their support shafts. Similarly, the rollers 19f, 19g, 19h are arranged such that outer surfaces thereof are located on the same arc in a vertical plane including their support shafts.

Thus, the first left wheel 19 is configured such that rotation of the first left wheel 19 about the axle 20 advances the first left wheel 19 in the rotating direction and rotation of each roller 19c, 19d, 19e, 19f, 19g, 19h slides the first left wheel 19 in a horizontal direction intersecting with the rotating direction and the axle 20.

With the automatic guided vehicle 1 according to this embodiment having the above-described configuration, under control by the controller (not illustrated), the automatic guided vehicle 1 runs in accordance with driving of the motors 23, 32 and the liftable table 4 lifts up/down in accordance with driving of the lifting mechanism.

Figure 7:
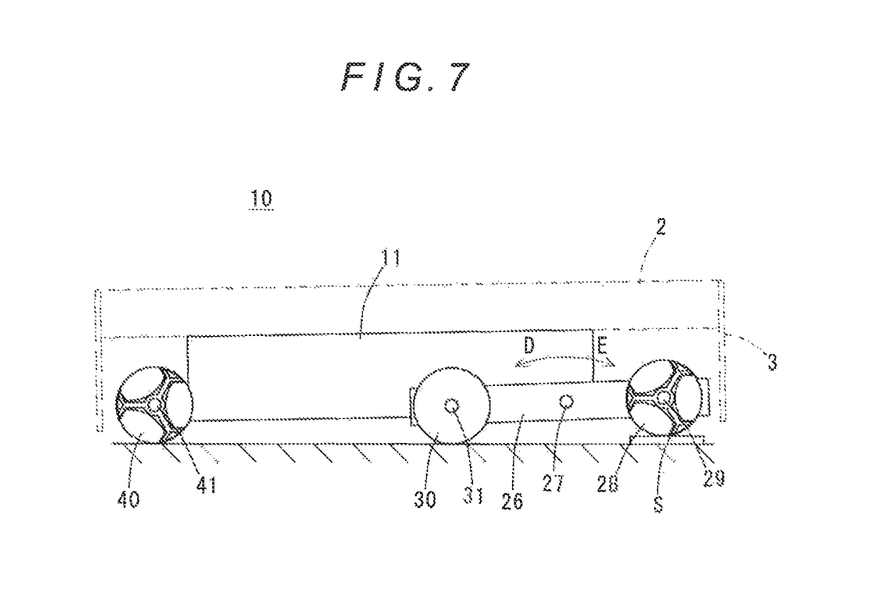
FIG. 7 is an illustrative diagram illustrating an action of the running device according to the embodiment.

In the case where the automatic guided vehicle 1 runs in a plant, if, for example, the first right wheel 28 runs onto a step S provided in the plant as shown in FIG. 7, the first right support arm 26 swings in the arrow D direction, whereby the first right wheel 30 as a drive wheel as well as the first left wheels 19, 21, the first right wheel 28, the second left wheel 38, and the second right wheel 40 are all kept in contact with the ground surface. On the other hand, if the first right wheel 30 runs onto the step S, the first right support arm 26 swings in the arrow E direction, whereby the first left wheels 19, 21, the first right wheels 28, 30, the second left wheel 38, and the second right wheel 40 are all kept in contact with the ground surface.

Similarly, if the first left wheel 19 runs onto the step S, the first left support arm 17 swings in the arrow D direction, whereby the first left wheel 21 as a drive wheel as well as the first left wheel 19, the first right wheels 28, 30, the second left wheel 38, and the second right wheel 40 are all kept in contact with the ground surface. On the other hand, if the first left wheel 21 runs onto the step S, the first left support arm 17 swings in the arrow E direction, whereby the first left wheels 19, 21, the first right wheels 28, 30, the second left wheel 38, and the second right wheel 40 are all kept in contact with the ground surface.

Figure 8:
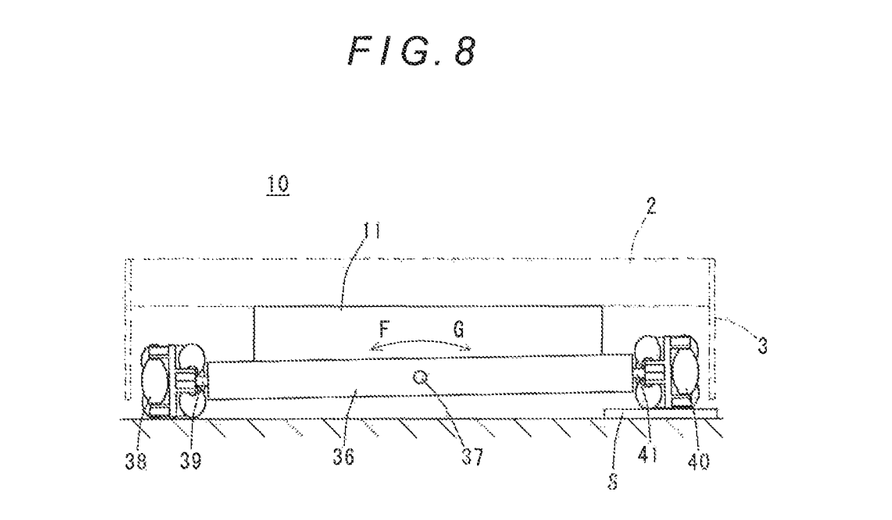
FIG. 8 is an illustrative diagram illustrating an action of the running device according to the embodiment.

Further, if the second right wheel 40 runs onto the step S as shown in FIG. 8, the second support arm 36 swings in the arrow F direction, whereby the first left wheels 19, 21, the first right wheels 28, 30, the second left wheel 38, and the second right wheel 40 are all kept in contact with the ground surface. On the other hand, if the second left wheel 38 runs onto the step S, the second support arm 36 swings in the arrow G direction, whereby the first left wheels 19, 21, the first right wheels 28, 30, the second left wheel 38, and the second right wheel 40 are all kept in contact with the ground surface.

As described above, with the automatic guided vehicle 1 according to this embodiment, when one or more of the first left wheels 19, 21, first right wheels 28, 30, second left wheel 38, and second right wheel 40 run onto a step S on the ground, the corresponding one or ones of the first left support arm 17, first right support arm 26, and second support arm 36 swing so that the difference in level of the step S is absorbed and all the wheels are thereby kept in contact with the ground surface, which enables the automatic guided vehicle 1 to run stably.

Further, the running device 10 of the automatic guided vehicle 1 is configured such that the first left wheels 19, 21, the first right wheels 28, 30, and the second left and right wheels 38, 40 are respectively supported by the first left support arm 17, the first right support arm 26, and the second support arm 36 that are swingably supported. Therefore, the running device 10 has a simple structure as compared with the conventional running device and therefore can be manufactured at a low cost.

Further, the swinging motions of the first left support arm 17, first right support arm 26, and second support arm 36 also provide a shock-absorbing effect; therefore, it is not necessary to provide a suspension that is conventionally required. Also in this respect, the running device 10 has a simple structure as compared with the conventional running device and therefore can be manufactured at a low cost.

Figure 9:
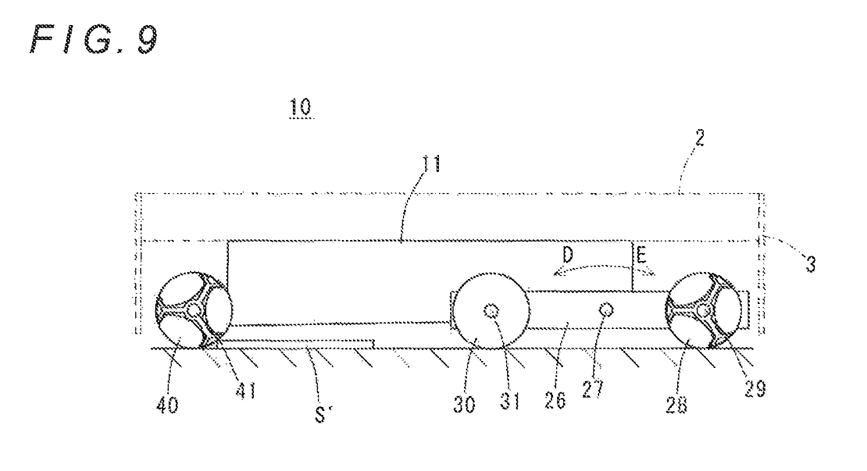
FIG. 9 is an illustrative diagram illustrating an action of the running device according to the embodiment.

Further, in the running device 10 according to this embodiment, the first left wheel 19, the first right wheel 28, the second left wheel 38, and the second right wheel 40, which are driven wheels, are each composed of an omni wheel; therefore, when the running direction of the automatic guided vehicle 1 that is running in a predetermined direction needs to be changed to another direction with any of these wheels in contact with a step, the running direction can be changed smoothly. For example, in the case where the running direction of the automatic guided vehicle 1 is changed with the second right wheel 40 in contact with a step S' as shown in FIG. 9, the running direction can be changed without any special preliminary operation.

Figure 10:
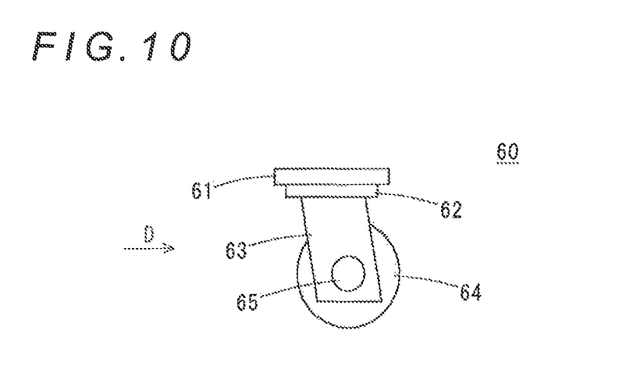
FIG. 10 is a front view illustrating a driven wheel in another embodiment of the present invention.
Figure 11:
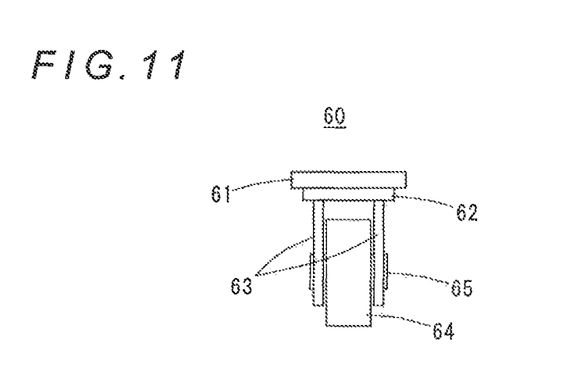
FIG. 11 is a side view of the driven wheel as viewed in the direction of arrow D in FIG. 10.

A universal wheel 60 as illustrated in FIGS. 10 and 11 is conventionally known as a driven wheel. This universal wheel 60 consists of, for example, a base plate 61 to be attached to a lower surface of the first left support arm 17, first right support arm 26, or second support arm 36, a rotating plate 62 mounted to a lower surface of the base plate 61, support plates 63, 63 arranged with a predetermined distance therebetween on a lower surface of the rotating plate 62 to extend down from the lower surface of the rotating plate 62, a support shaft 65 supported by the support plates 63, 63, and a wheel 64 rotatably supported by the support shaft 65 between the support plates 63, 63. This universal wheel 60 is configured such that the wheel 64 is turned in a horizontal plane by horizontal rotation of the rotating plate 62 and the running direction of the wheel 64 is changed by this turning of the wheel 64.

With this universal wheel 60, the changing of the running direction of the universal wheel 60 requires turning of the wheel 64 to a desired direction and also requires a distance for movement for performing the turning. Therefore, for example, in the case where the running direction of the automatic guided wheel 1 is changed by 90° either to the left or to the right with the wheel 64 of the universal wheel 60 in contact with the step S' similarly to in FIG. 9, the step S' obstructs the turning of the wheel 64; consequently, the running direction of the automatic guided vehicle 1 cannot be changed.

Hereinbefore, a specific embodiment of the present invention has been described. However, the present invention is not limited to the above-described embodiment and can be implemented in other manners.

Figure 12:
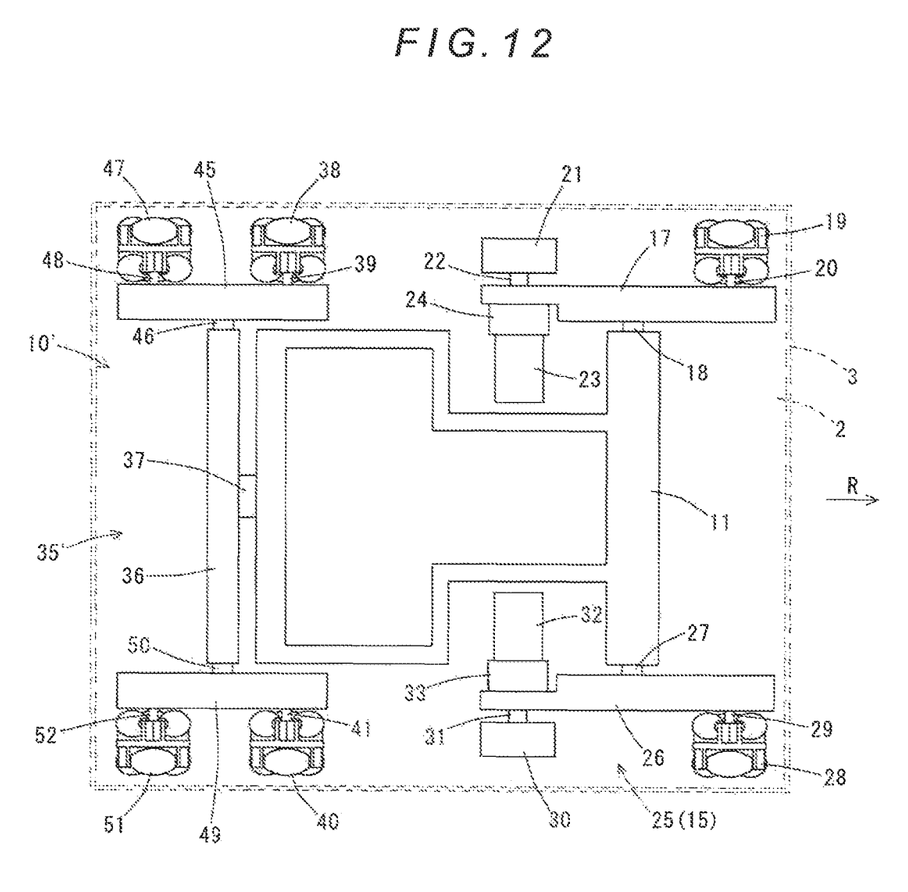
FIG. 12 is a plan view illustrating a running device according to a further embodiment of the present invention.

For example, the running device according to the present invention may be configured as illustrated in FIG. 12. The thus-configured running device 10' has a second wheel part 35' instead of the second wheel part 35 in the above-described embodiment. In this respect, the running device 10' differs in configuration from the above-described running device 10. The other components of the running device 10' are the same as those of the running device 10. Therefore, in FIG. 12, the same components are denoted by the same reference numerals as used for the running device 10.

As illustrated in FIG. 12, the second wheel part 35' includes a third left support arm 45 and a third right support arm 49 respectively arranged on both ends of the second support arm 36. The third left support arm 45 has second left wheels 38, 47 respectively supported on both ends thereof in a manner to be rotatable about horizontal axles 39, 48 perpendicular to the running direction. The third right support arm 49 has second right wheels 40, 51 respectively supported on both ends thereof in a manner to be rotatable about horizontal axles 41, 52 perpendicular to the running direction.

In the thus-configured running device 10', the frame 11 is supported by eight wheels in total, namely, the two first left wheels 19, 21 arranged on the first left support arm 17, the two first right wheels 28, 30 arranged on the first right support arm 26, the two second left wheels 38, 47 arranged on the third left support arm 45, and the two second right wheels 40, 51 arranged on the third right support arm 49. Further, besides the swinging motions of the first left support arm 17, first right support arm 26, and second support arm 36, the swinging motions of the third left support arm 45 and third right support arm 49 are also capable of absorbing a difference in level on the ground. Therefore, the running device 10' is capable of absorbing more various types of unevenness formed on the ground.

In the above-described running devices 10 and 10', the first left wheel 21 and the first right wheel 30 are drive wheels. However, the present invention is not limited to this configuration, and a configuration is possible in which wheels other than the first left wheel 21 and the first right wheel 30 are drive wheels. For example, the running device 10 may have a configuration in which either of the first left wheel 19 and second left wheel 38 and either of the first right wheel 28 and second right wheel 40 are drive wheels. Similarly, the running device 10' may have a configuration in which the first left wheel 19 and either of the second left wheels 38, 47 are drive wheels and the first right wheel 28 and either of the second right wheels 40, 51 are drive wheels.

Further, in the above-described embodiments, each of the wheels as a driven wheel is composed of an omni wheel. However, the present invention is not limited to this configuration. Although the disadvantage as described above is supposed to occur in changing the running direction, the universal wheel 60 as illustrated in FIGS. 10 and 11 may be used for the wheels as driven wheels because it also has advantages, such as that it is relatively inexpensive.

As already mentioned above, the foregoing description of the embodiments is not limitative but illustrative in all aspects. One skilled in the art would be able to make variations and modifications as appropriate. The scope of the invention is not defined by the above-described embodiments, but is defined by the appended claims. Further, the scope of the invention encompasses all modifications made from the embodiments within a scope equivalent to the scope of the claims.

REFERENCE SIGNS LIST

1 Automatic guided vehicle
2 Support base
3 Cover
4 Liftable table
5 Sensor
10 Running device
11 Frame
15 First wheel part
16 First left wheel unit
17 First left support arm
19, 21 First left wheel
23 Motor
26 First right support arm
28, 30 First right wheel
32 Motor
35 Second wheel part
36 Second support arm
38 Second left wheel
40 Second right wheel

The invention claimed is:

1. A running device arranged on a running vehicle, comprising:
   a frame; and
   a first wheel part and a second wheel part arranged along a running direction and connected to the frame,
   the first wheel part including a first left support arm and a first right support arm respectively disposed on a left side and a right side with respect to the running direction and each connected to the frame in a manner to be swingable within a vertical plane extending along the running direction,
   the second wheel part including a second support arm connected to the frame in a manner to be swingable within a vertical plane perpendicular to the running direction,
   the first left support arm having a first left wheel on each of both sides of a center of swinging thereof, the first left wheels being each supported in a manner to be rotatable about a horizontal axle perpendicular to the running direction,
   the first right support arm having a first right wheel on each of both sides of a center of swinging thereof, the first right wheels being each supported in a manner to be rotatable about a horizontal axle perpendicular to the running direction,
   the second support arm having a second left wheel and a second right wheel respectively on both sides of a center of swinging thereof, the second left wheel and the second right wheel being each supported in a manner to be rotatable about a horizontal axle perpendicular to the running direction,
   the center of swinging of the first left support arm being positioned on a line connecting centers of the two first left wheels,
   the center of swinging of the first right support arm being positioned on a line connecting centers of the two first right wheels.

2. The running device according to claim 1, wherein:
   the second support arm of the second wheel part has a third left support arm and a third right support arm respectively on both sides of the center of swinging thereof, the third left support arm and the third right support arm being each swingable within a plane extending along the running direction;

the third left support arm has the second left wheel on each of both sides of a center of swinging thereof, the second left wheels being each supported in a manner to be rotatable about an axle perpendicular to the running direction; and the third right support arm has the second right wheel on each of both sides of a center of swinging thereof, the second right wheels being each supported in a manner to be rotatable about an axle perpendicular to the running direction.

3. The running device according to claim 1, wherein at least one of the first left wheels and second left wheel and at least one of the first right wheels and second right wheel are drive wheels.

4. The running device according to claim 3, wherein each of the wheels other than the drive wheels comprises a universal wheel.

5. The running device according to claim 3, wherein each of the wheels other than the drive wheels comprises an omni wheel.

6. The running device according to claim 2, wherein at least one of the first left wheels and second left wheels and at least one of the first right wheels and second right wheels are drive wheels.

7. The running device according to claim 6, wherein each of the wheels other than the drive wheels comprises a universal wheel.

8. The running device according to claim 6, wherein each of the wheels other than the drive wheels comprises an omni wheel.

* * * * *